(12) United States Patent
Chen et al.

(10) Patent No.: US 11,245,752 B2
(45) Date of Patent: Feb. 8, 2022

(54) LOAD BALANCING IN A HIGH-AVAILABILITY CLUSTER

(71) Applicant: Juniper Networks, Inc., Sunnyvale, CA (US)

(72) Inventors: Fei Chen, Beijing (CN); Weisong Peng, Beijing (CN); Xia Zhu, Beijing (CN); Tiejun Zhang, Beijing (CN); Na Liu, Beijing (CN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/916,588

(22) Filed: Jun. 30, 2020

(65) Prior Publication Data

US 2021/0344748 A1 Nov. 4, 2021

(30) Foreign Application Priority Data

Apr. 30, 2020 (WO) ................ PCT/CN2020/088390

(51) Int. Cl.
*H04L 29/08* (2006.01)
*H04L 29/06* (2006.01)
*G06F 16/23* (2019.01)

(52) U.S. Cl.
CPC ...... *H04L 67/1031* (2013.01); *G06F 16/2379* (2019.01); *H04L 63/08* (2013.01)

(58) Field of Classification Search
CPC .. H04L 67/1031; H04L 63/08; G06F 16/2379
See application file for complete search history.

(56) References Cited

U.S. PATENT DOCUMENTS

| | | | | |
|---|---|---|---|---|
| 7,941,837 | B1* | 5/2011 | Jiang | H04L 63/0209 726/11 |
| 8,131,860 | B1* | 3/2012 | Wong | H04L 67/142 709/228 |
| 8,316,110 | B1* | 11/2012 | Deshmukh | G06F 11/1484 709/220 |
| 9,813,413 | B2* | 11/2017 | Anantha Padmanaban | H04L 61/1511 |
| 10,051,046 | B1* | 8/2018 | Zacharski | H04L 67/14 |
| 10,313,474 | B1* | 6/2019 | Farrugia | H04L 67/1012 |
| 10,924,538 | B2* | 2/2021 | Troy | H04L 69/40 |
| 2003/0028514 | A1* | 2/2003 | Lord | G06F 11/2082 |
| 2003/0126240 | A1* | 7/2003 | Vosseler | H04L 43/12 709/221 |

(Continued)

*Primary Examiner* — Javier O Guzman
(74) *Attorney, Agent, or Firm* — Harrity & Harrity, LLP

(57) ABSTRACT

A first network device may configure a high-availability cluster associated with a network that includes the first network device and a second network device. The first network device may identify a plurality of devices communicatively coupled to the network and determine a set of tasks for the plurality of devices. The first network device may queue the set of tasks in a task queue that is accessible to the second network device. The second network device may perform a first task and the first network device may perform a second task of the set of tasks. The first network device may receive first result information that is associated with a performance of the first task. The first network device may determine a result associated with performing the second task. The first network device may synchronize the first result information and the second result information with the second network device.

20 Claims, 11 Drawing Sheets

(56) References Cited

U.S. PATENT DOCUMENTS

| | | | |
|---|---|---|---|
| 2004/0177108 A1* | 9/2004 | Connelly | G06F 9/542 709/201 |
| 2005/0159927 A1* | 7/2005 | Cruz | G06F 11/0748 702/188 |
| 2009/0144720 A1* | 6/2009 | Roush | G06F 8/65 717/171 |
| 2010/0313064 A1* | 12/2010 | Boctor | H04L 43/0817 714/4.1 |
| 2011/0055364 A1* | 3/2011 | Heim | H04L 41/0846 709/223 |
| 2011/0289417 A1* | 11/2011 | Schaefer | G06F 11/2028 715/735 |
| 2013/0103977 A1* | 4/2013 | Zimmermann | G06F 11/0793 714/4.11 |
| 2013/0155902 A1* | 6/2013 | Feng | G06F 11/203 370/255 |
| 2013/0205017 A1* | 8/2013 | Hirose | H04L 41/0668 709/224 |
| 2014/0096121 A1* | 4/2014 | Joshi | H04L 67/34 717/170 |
| 2014/0143854 A1* | 5/2014 | Lopez | H04L 63/0218 726/14 |
| 2015/0222604 A1* | 8/2015 | Ylonen | G06F 21/575 713/171 |
| 2016/0078116 A1* | 3/2016 | Alewine | G06F 11/1658 707/615 |
| 2018/0246791 A1* | 8/2018 | Xie | G06F 11/2007 |
| 2019/0286737 A1* | 9/2019 | Pan | G06F 9/45558 |
| 2019/0306231 A1* | 10/2019 | Shimoga Manjunatha | H04L 63/0263 |
| 2020/0192772 A1* | 6/2020 | Asveren | G06F 11/0751 |
| 2021/0029083 A1* | 1/2021 | Li | H04L 63/0236 |

* cited by examiner

LOAD BALANCING IN A HIGH-AVAILABILITY CLUSTER

CROSS-REFERENCE TO RELATED APPLICATION

This application claims priority to Patent Cooperation Treaty (PCT) Application No. PCT/CN2020/088390, filed on Apr. 30, 2020, and entitled "LOAD BALANCING IN A HIGH-AVAILABILITY CLUSTER," the content of which is incorporated by reference herein in its entirety.

BACKGROUND

A high-availability cluster may include multiple cluster nodes that are linked or connected together to form a logical or virtual node that is more resilient to faults than if the multiple cluster nodes were to operate in discrete configurations. The multiple cluster nodes in the high-availability cluster may share session information associated with routing sessions and/or user sessions, such that faults in the high-availability cluster may be mitigated by near instantaneous failover and/or reversion of stateful network traffic.

SUMMARY

According to some implementations, a method may include configuring, by a first network device, a high-availability cluster that includes the first network device and a second network device, wherein the high-availability cluster is associated with a network; identifying, by the first network device, a plurality of devices communicatively coupled to the network; determining, by the first network device, a set of tasks associated with the plurality of devices; queuing, by the first network device, the set of tasks in a task queue that is accessible to the second network device via a high-availability communication link of the high-availability cluster, wherein the task queue is configured to permit the second network device to perform a first task of the set of tasks to load balance the set of tasks between the first network device and the second network device; performing, by the first network device, a second task of the set of tasks; receiving, by the first network device and from the second network device, first result information that is associated with a performance of the first task by the second network device; storing, by the first network device, the first result information in a directory data structure of the first network device; determining, by the first network device, a result associated with performing the second task; storing, by the first network device, second result information that identifies the result in the directory data structure; and synchronizing, by the first network device and via the high-availability communication link, the first result information and the second result information with the second network device.

According to some implementations, a first network device may include a memory, and a processor to: configure a high-availability communication link with a second network device to form a high-availability cluster, wherein the high-availability cluster is associated with a network; identify a set of domain controllers that are communicatively coupled to the network and a set of user devices that are communicatively coupled to the network; detect a domain controller event that is associated with a user device of the set of user devices; add, to a task queue, a domain controller task that is associated with the domain controller event, wherein the task queue is configured to be accessible to the second network device, to permit the second network device to perform the domain controller task or the first network device to perform the domain controller task; obtain result information associated with a performance of the domain controller task by the second network device; and perform, based on the result information, an action associated with the user device.

According to some implementations, a non-transitory computer-readable medium may store one or more instructions. The one or more instructions, when executed by one or more processors of a first network device, may cause the one or more processors to: configure a high-availability cluster for a network, wherein the high-availability cluster is formed to include the first network device and a second network device; identify a plurality of devices communicatively coupled to the network; determine a set of tasks for the plurality of devices; queue the set of tasks in a task queue that is accessible to the second network device via a high-availability communication link of the high-availability cluster, wherein the task queue is configured to permit the second network device to perform a task of the set of tasks to load balance the set of tasks between the first network device and the second network device; obtain a result of a performance of the task by the second network device; and perform an action associated with the result.

DETAILED DESCRIPTION

Figure 1A:
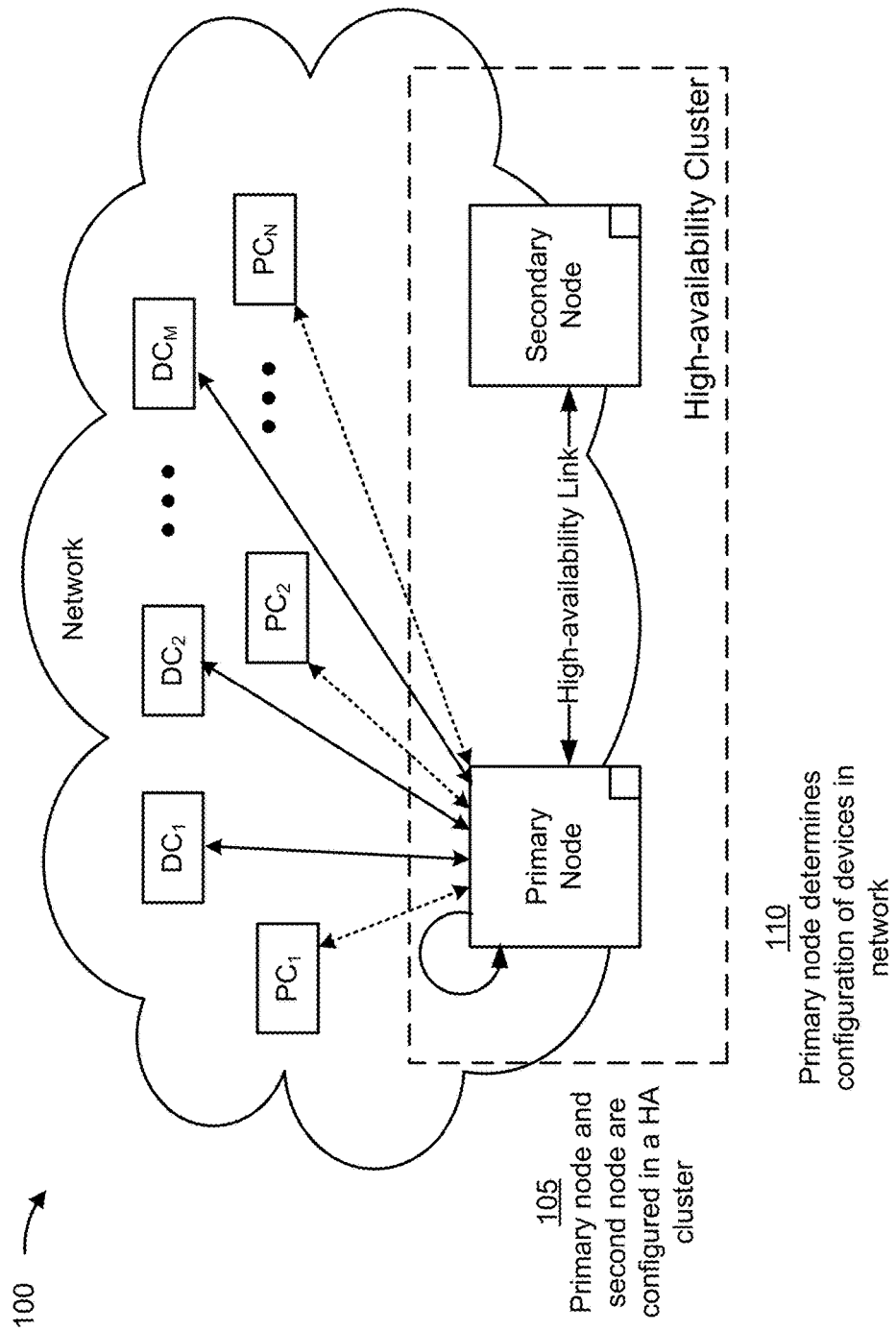
FIGS. 1A-1C are diagrams of one or more example implementations described herein.

The following detailed description of example implementations refers to the accompanying drawings. The same reference numbers in different drawings may identify the same or similar elements.

To form a high-availability cluster, multiple nodes (e.g., two nodes) may be linked and/or connected via multiple interfaces. A control interface between cluster nodes may provide a control link by which cluster nodes may exchange control traffic in order to synchronize routing engine sessions of the cluster nodes. A fabric interface between cluster nodes may provide a fabric link by which cluster nodes may forward network traffic (e.g., traffic that is originated from and/or destined for network devices and/or client devices that are communicatively connected with the high-availability cluster).

An interface of the high-availability cluster may designate one of the multiple nodes as a primary (e.g., master) node and the remaining nodes of the multiple nodes as backup (e.g., slave) nodes. The high-availability cluster may be configured such that the primary node performs and/or assigns tasks (e.g., control tasks, authorization tasks, probe tasks, and/or the like) for a network associated with the high-availability cluster. The backup nodes may be configured to perform tasks for the network when indicated by the primary node or based on a failure of the primary node. However, configuring the primary node to perform all tasks for the network may cause the primary node to become overloaded. This may reduce a performance capability (e.g., a processing capability, a memory capability, a communication capability, and/or the like) of the primary node. Additionally, the primary node may be unavailable for other network tasks (e.g., traffic routing, packet switching, and/or the like). Configuring the primary node to perform and/or assign tasks for the network may waste computing resources (e.g., processing resources, memory resources, communication resources, and/or the like) and/or network resources associated with a reduced performance capability of the primary node, an unavailability of the primary node, and/or the like.

Some implementations described herein enable a load balancing between a primary node and one or more backup nodes of a high-availability cluster. For example, the primary node may queue a set of tasks for the network in a task queue. The primary node and the one or more backup nodes may select and perform tasks from the task queue based on an operating state associated with each node (e.g., active, idle, and/or the like). As a result, the primary node and the one or more backup nodes may load balance the set of tasks between the primary node and the one or more backup nodes. This may conserve computing resources and/or network resources that would have otherwise been associated with a reduced performance capability of the primary node (e.g., based on being overloaded due to the load associated with the set of tasks), an unavailability of the primary node (e.g., based on performing and/or assigning the set of tasks), and/or the like.

Figure 1B:
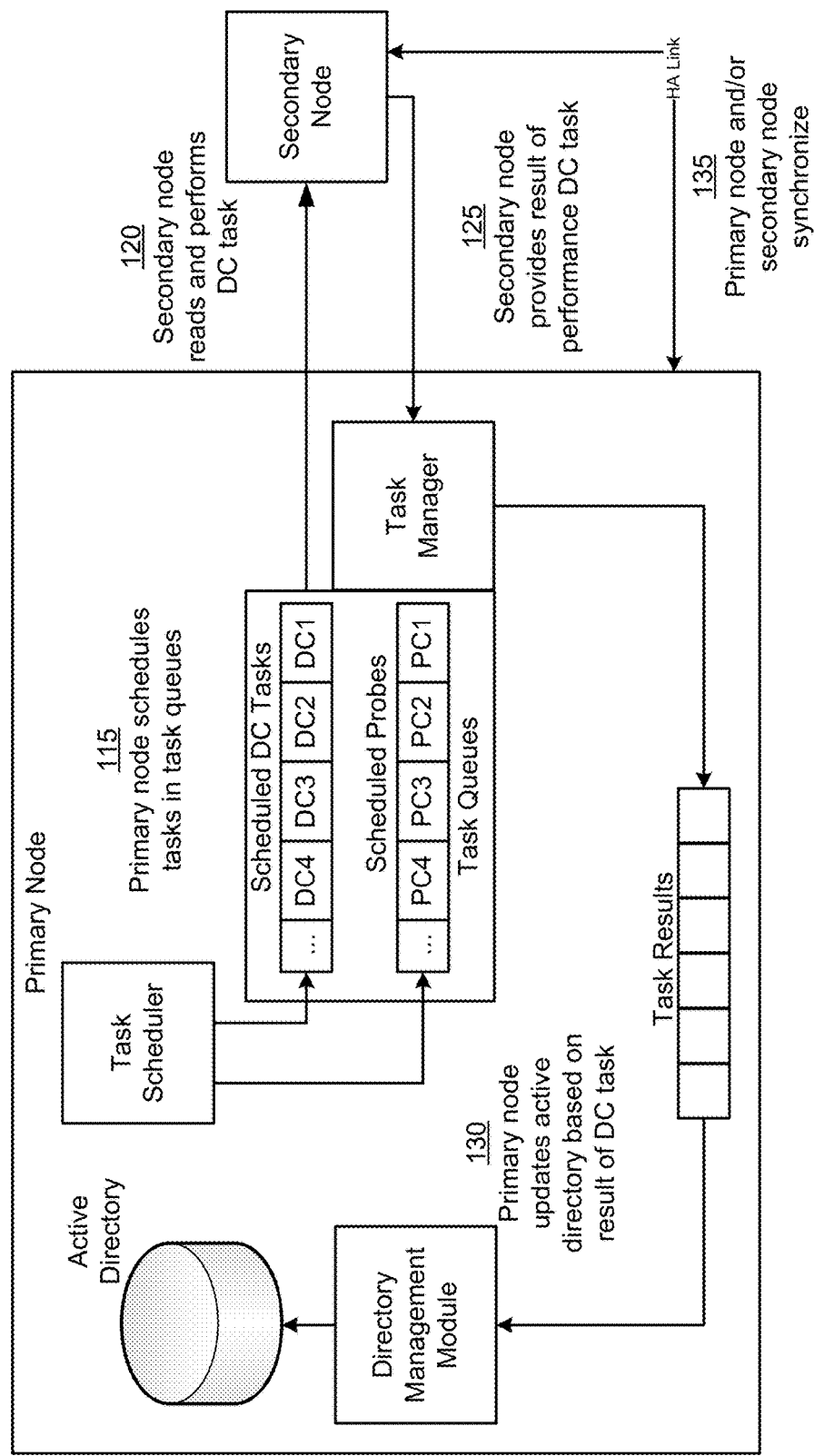
Figure 1C:
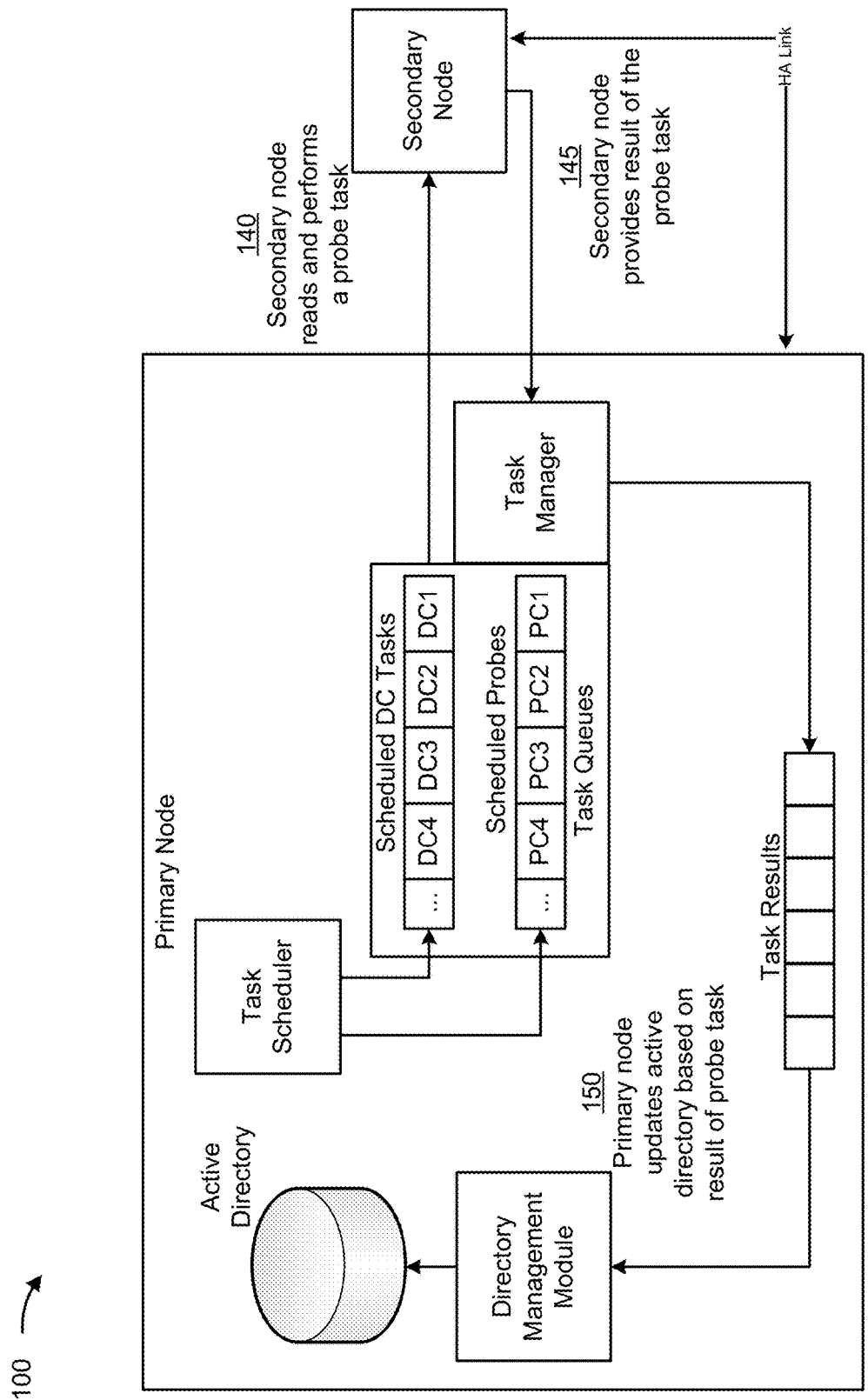

FIGS. 1A-1C are diagrams of one or more example implementation(s) 100 described herein. As shown in FIGS. 1A-1C, example implementation 100 includes a primary node and a secondary node in a high-availability cluster, one or more domain controllers (e.g., $DC_1$-$DC_M$, where M indicates a quantity of domain controllers in a network), and one or more user devices (e.g., $PC_1$-$PC_N$, where N indicates a quantity of user devices in the network). The primary node and/or the secondary node may be a network device. The primary node and/or the secondary node may include a router, a switch, or a gateway, among other examples. In some aspects, example implementation(s) 100 may include a greater quantity of nodes, a different quantity of domain controllers, a different quantity of user devices, and/or a greater quantity of high-availability clusters.

In some implementations, the primary node and the secondary node may be linked and/or connected together to form a high-availability cluster. In this case, the primary node and the secondary node may be linked and/or connected together to form a logical or virtual node (which may be referred to as a chassis cluster) that is more resilient to faults than if the primary node and the secondary node were to operate in discrete configurations. The primary node and the secondary node in the high-availability cluster may share session information associated with routing engine sessions and/or user sessions such that faults in the high-availability cluster may be mitigated by near instantaneous failover and/or reversion of stateful network traffic. The high-availability cluster may be deployed in various settings, contexts, and/or locations, such as an office branch, a campus, a retail location, and/or the like.

As shown in FIG. 1A, and by reference number 105, the primary node and the secondary node may be configured in the high-availability cluster. For example, the primary node and the secondary node may receive designated roles. In some implementations, the primary node may be a master node and the secondary node may be a slave or backup node. The primary node and the secondary node may be configured to exchange information via a high-availability link. The high-availability link may include multiple links (e.g., a control link, a fabric link, and/or the like). For example, the primary node and the secondary node may exchange control traffic (e.g., traffic that is originated and/or terminated in a control plane or a routing engine) via the high-availability link, and may forward network traffic (e.g., traffic that is to be forwarded by a data plane or forwarding engine of a node) via the high-availability link.

In some implementations, the primary node and/or the secondary node may configure a cluster identifier and a node identifier. The cluster identifier may be associated with the high-availability cluster and may distinguish the high-availability cluster from other high-availability clusters. In this case, the primary node and the secondary node may be configured with the same cluster identifier such that the primary node and the secondary node are to be included in the same high-availability cluster. The cluster identifier may include a name, a numeric value, an alpha-numeric string, and/or the like.

The node identifier may be associated with and specific to a node, such that the node identifier may distinguish the node from other nodes in the same high-availability cluster. In this case, the primary node and the secondary node may be configured with different node identifiers. The node identifier may include a name, a numeric value, an alpha-numeric string, and/or the like.

In some implementations, a node (e.g., the primary node, the secondary node, and/or the like) may configure a cluster identifier and node identifier for the node based on receiving an instruction (e.g., a chassis cluster command and/or another type of instruction), which may be provided as input to the node (e.g., by a user via a console port, a command line interface, and/or another means for input to the node). In some implementations, a node may automatically configure a cluster identifier and node identifier for the cluster node based on an event, such as a reboot or restart of the node and/or the like.

As shown by reference number 110, the primary node may determine a configuration of one or more devices in the network of the high-availability cluster. In some implementations, the primary node may determine the configuration of the one or more devices in the network based on an indication received from a device (e.g., a server device, a controller, and/or the like) included in the network. In some implementations, the primary node may determine the configuration of the one or more devices in the network based on determining a network topology of the network. In some implementations, the primary node may determine a configuration of one or more devices in the network based on communicating with the one or more devices. The one or more devices may include one or more domain controllers, one or more user devices, one or more other network devices (e.g., server devices, firewall devices, and/or the like), and/or the like.

A domain controller may be a server device that responds to security authentication requests within the network. The domain controller may be a firewall device. In some implementations, the domain controller may be associated with a firewall device or a firewall cluster. The domain controller may be responsible for allowing host access to network resources. The domain controller may authenticate user devices, store user account information, enforce a security policy for a network, and/or the like.

A user device may establish a connection with the network by sending a request to a domain controller. The domain controller may authorize the user device to establish a connection with the network by authenticating the user device, requesting authentication of the user device, enforcing a security policy, and/or the like.

In some implementations, the primary node may configure and/or maintain an active directory of one or more devices communicatively coupled to the network. For example, as shown in FIG. 1A, the domain controllers and/or the active user devices of the network may communicate with the primary node. The primary node may identify and store identifiers associated with the domain controller and/or the user devices of the network in the active directory. The active directory may be a data structure, such as a table, a list (e.g., a structured list sorted by device, an unstructured list, and/or the like), an index (e.g., that indexes the application information based on the application), a mapping, and/or the like. The primary node may synchronize with the secondary node by transmitting the active directory to the secondary node via the high-availability link. The active directory may be stored by the primary node and/or the secondary node.

As shown in FIG. 1B, and by reference number 115, the primary node may schedule tasks to be performed by the primary node or the secondary node. The primary node may schedule tasks using a task scheduler that receives information from the network (e.g., from a device of the network) and generates a task based on the information. For example, the primary node may receive a communication from a domain controller. The communication may indicate a domain controller event, such as an authentication event, an authorization event, a firewall event, and/or the like. The domain controller may send the communication indicating the domain controller event based on a communication received from a user device. For example, a user device may request access to the network (e.g., access to network resources) from the domain controller. The domain controller may send a communication to the primary node indicating a domain controller event based on the user device requesting access to the network. The task scheduler may generate a task to authorize or authenticate the user device (e.g., the user device that requested access to the network) based on receiving the communication from the domain controller. In some implementations, the primary node may detect a domain controller event based on an action performed by a domain controller.

In some implementations, the primary node may determine a domain controller event based on a communication received from a user device of the network. For example, the primary node may receive a communication from the user device requesting access to the network. The primary node may determine that the communication is associated with a domain controller event. The primary node may generate a domain controller task based on receiving the communication from the user device. The primary node may add the domain controller task to a set of tasks to be performed by the primary node and/or the secondary node.

The task scheduler may queue tasks in one or more task queues of the primary node. The one or more task queues may be maintained within a task data structure of the primary node. For example, the task scheduler may queue a set of domain controller tasks based on receiving or detecting a domain controller event. The task scheduler may generate and/or queue domain controller tasks (e.g., associated with authenticating one or more user devices that are communicatively coupled to the network) and/or probe tasks (e.g., associated with monitoring communication links between the one or more user devices and the network). The probe tasks may be generated and/or queued based on a performed domain controller task. For example, a domain controller task may involve authenticating a user device that is communicatively coupled to the network. The primary node or the secondary node may perform the domain controller task and indicate that the user device has been authenticated (e.g., authorizing the user device to access the network). The task scheduler may generate a probe task associated with monitoring (e.g., verifying a connection status, determining a connection metric or quality of the connection, and/or the like) the communication link between the user device and the network. In some implementations, the probe tasks may be scheduled periodically by the task scheduler. In some implementations, the primary node may identify a probe schedule associated with a user device and generate, based on the probe schedule, one or more probe tasks associated with the user device. In some implementations, the probe tasks may be scheduled based on the last probe task associated with the user device.

In some implementations, the task scheduler may queue the tasks in the order in which they are generated. In some implementations, the task scheduler may prioritize one task over another task. For example, the task scheduler may prioritize domain controller tasks over probe tasks. In some implementations, the task scheduler may prioritize a domain controller task over another domain controller task. In some implementations, the task scheduler may prioritize a probe task over another probe task (e.g., based on a result of a previously performed probe task. The tasks may be queued in a single task queue. In some implementations, the primary node may maintain a task queue for domain controller tasks and/or a task queue for probe tasks. The task queue(s) may be hosted by the primary node.

As shown by reference number 120, the secondary node may access (e.g., read) the one or more task queues via the high-availability link. In some implementations, a task manager of the primary node may communicate with a task manager of the secondary node via the high-availability link to enable the secondary node to access the one or more task queues. In some implementations, the task manager of the secondary node may access the task queue and pull a task to be performed by the secondary node. In some implementations, the task manager may be a windows management instrumentation client. In some implementations, there may be a plurality of secondary nodes accessing and/or performing tasks indicated in the task queue. Additionally, or alternatively, the primary node may read and perform on or more tasks in the task queue. Allocation of a first task in the task queue between the primary node or the secondary node may be based on which node accesses and pulls a task from the task queue first (e.g., the primary node or the secondary node may perform the first task from the task queue).

The secondary node may access the one or more task queues and remove or select a task. For example, as shown in FIG. 1B, the secondary node may select and/or remove a domain controller task from a task queue of the primary node. The secondary node may select and remove a task from the task queue based on an operating state of the secondary node. For example, a controller of the secondary node may indicate that the secondary node is in an idle state (e.g., not performing any other functions or tasks). The secondary node may select a task from the task queue based on the secondary node being in the idle state. The controller of the secondary node may cause the secondary node to be placed in an active state as a result of selecting the task from the task queue.

The secondary node may select the domain controller task based on the order of the tasks in the task queue (e.g., determined by the task scheduler of the primary node, as described above). In some implementations, the secondary node may select the domain controller task based on a capability of the secondary node (e.g., the secondary node may not select a task that the secondary node is not capable of performing).

The secondary node may perform the domain controller task based on selecting and/or removing the domain controller task from the task queue. For example, the domain controller task may be a task to authenticate a user device communicatively coupled to the network. The secondary node may identify an identifier associated with the user device. The secondary node may determine, based on the identifier associated with the user device, if the user device is an authenticated/authorized user device for the network (e.g., based on user credentials, a user identifier, a user device identifier, and/or the like). The secondary node may update an active directory of the secondary node based on performing the domain controller task. For example, if the secondary node determines that a user device is an authenticated/authorized user device of the network based on performing the domain controller task, the secondary node may add the identifier of the user device to the active directory of the secondary node.

As shown by reference number 125, the secondary node may provide result information to the primary node indicating a result of the domain controller task. For example, if the secondary node determines, based on performing the domain controller task, that the user device is an authenticated/authorized user device for the network, the result information may indicate the identifier associated with the user device and that the user device is an authenticated/authorized user device for the network. Conversely, if the secondary node determines, based on performing the domain controller task, that the user device is not an authenticated/authorized user device for the network, the result information may indicate the identifier associated with the user device and that the user device is not an authenticated/authorized user device for the network.

The secondary node may provide the result information to the primary node via the high-availability link. For example, the task manager of the secondary node may send the result information to the task manager of the primary node. In some implementations, the secondary node may provide the result information to one or more domain controllers of the network. In some implementations, the primary node may provide the result information to one or more domain controllers of the network.

In some implementations, the primary node and/or the secondary node may perform an action associated with the user device based on the result information of the domain controller task. For example, the action may be permitting the user device to access the network, enabling the user device to establish a connection with the network, enabling the user device to access network resources, and/or the like.

As shown by reference number 130, the primary node may update an active directory of the primary node based on the result of the domain controller task performed by the secondary node. The active directory may be a directory data structure. The active directory may identify one or more (or all) user devices that are currently active on the network (e.g., that have been authenticated/authorized based on the performance of a domain controller task). For example, the primary node may determine the result of the domain controller task based on the result information provided by the secondary node. The primary node may determine that the result of the domain controller task is that a user device has been authenticated/authorized. The primary node may identify an identifier associated with the user device and add (e.g., store) the identifier to the active directory of the primary node. In some implementations, a directory management module of the primary node may update the active directory based on the task results of tasks performed by the primary node and/or the secondary node.

In some implementations, the primary node (e.g., the task scheduler of the primary node) may generate one or more probe tasks based on the result information provided by the secondary node. For example, if the result information indicates an authenticated/authorized user device, the primary node may generate one or more probe tasks (e.g., one probe task, periodic probe tasks, and/or the like) to monitor a communication link between the user device and the network.

As shown by reference number 135, the primary node and/or the secondary node may synchronize via the high-availability link. Synchronization between the primary node and the secondary node may include sharing result information, sharing an active directory, and/or the like. Synchronization between the primary node and the secondary node may occur via the task manager of the primary node. In some implementations, the primary node and/or the secondary node may be scheduled to synchronize periodically (e.g., every 0.5 seconds, every second, every 5 seconds, every minute, and/or the like). In some implementations, the primary node and/or the secondary node may synchronize based on performing a task, updating an active directory, generating and/or scheduling new tasks, and/or the like. In some implementations, the synchronization may be between the primary node and a plurality of secondary nodes.

As shown in FIG. 1C, and by reference number 140, the secondary node may access (e.g., read) the one or more task queues via the high-availability link to select and/or remove a probe task. The probe task may be associated with a user device that was authenticated/authorized based on a domain controller task performed by the primary node or the secondary node. The secondary node may select and/or remove the probe task based on the secondary node being in an idle state. The secondary node may enter an active state as a result of selecting the probe task from the task queue of the primary node.

The secondary node may perform the probe task. The probe task may be associated with monitoring a communication link between a user device (e.g., a user device identified in the active directory of the primary node and/or the active directory of the secondary node) and the network. Monitoring the communication link may include measuring a connection metric (e.g., upload speed, download speed, and/or the like), determining a connection quality (e.g., based on packet loss, latency, reliability, and/or the like), determining a connectivity status between the user device and the network, and/or the like. In some implementations, the secondary node may update an active directory of the secondary node based on the performance of the probe task. For example, if the result of the probe task indicates that the user device is no longer connected to the network, the secondary node may remove an identifier associated with the user device from the active directory of the secondary node.

As shown by reference number 145, the secondary node may provide result information (e.g., indicating a result) associated with the performance of the probe task to the primary node. For example, the result information may indicate a connectivity status of a connection between user device and the network. In some implementations, the result information may indicate whether the user device is connected to the network.

The secondary node may provide the result information associated with the probe task to the primary node via the high-availability link. For example, the task manager of the secondary node may send the result information associated with the probe task to the task manager of the primary node. In some implementations, the secondary node may provide the result information associated with the probe task to one or more domain controllers of the network. In some implementations, the primary node may provide the result information associated with the probe task to one or more domain controllers of the network.

As shown by reference number 150, the primary node may update the active directory of the primary node based on the result information associated with the probe task provided by the secondary node. For example, if the result information indicates that the user device is no longer connected to the network, the primary node (e.g., the directory management module of the primary node) may remove an identifier associated with the user device from the active directory of the primary node. In some implementations, if the result information associated with the probe task indicates that the user device is connected to the network, the primary node (e.g., the task scheduler of the primary node) may generate and/or schedule one or more additional probe tasks associated with the user device. In some implementations, if the result information associated with the probe task indicates that a connection between the user device and the network is poor (e.g., indicated by a low connection metric, a low connection quality, and/or the like), the primary node (e.g., the task scheduler of the primary node) may schedule more frequent probe tasks (e.g., reduce an amount of time between probe tasks) associated with the user device.

As described above, the primary node and/or the secondary node may synchronize via the high-availability link. In this case, the primary node and/or the secondary node may synchronize based on the primary node and/or the secondary node updating the active directory (e.g., based on result information associated with the probe task). The primary node and/or the secondary node may synchronize based on a scheduled synchronization, as described above.

As a result, the secondary node may be configured to perform tasks indicated by the primary node based on an operating state of the secondary node. This may enable load balancing between the primary node and the secondary node with respect to the set of tasks indicated by the primary node.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
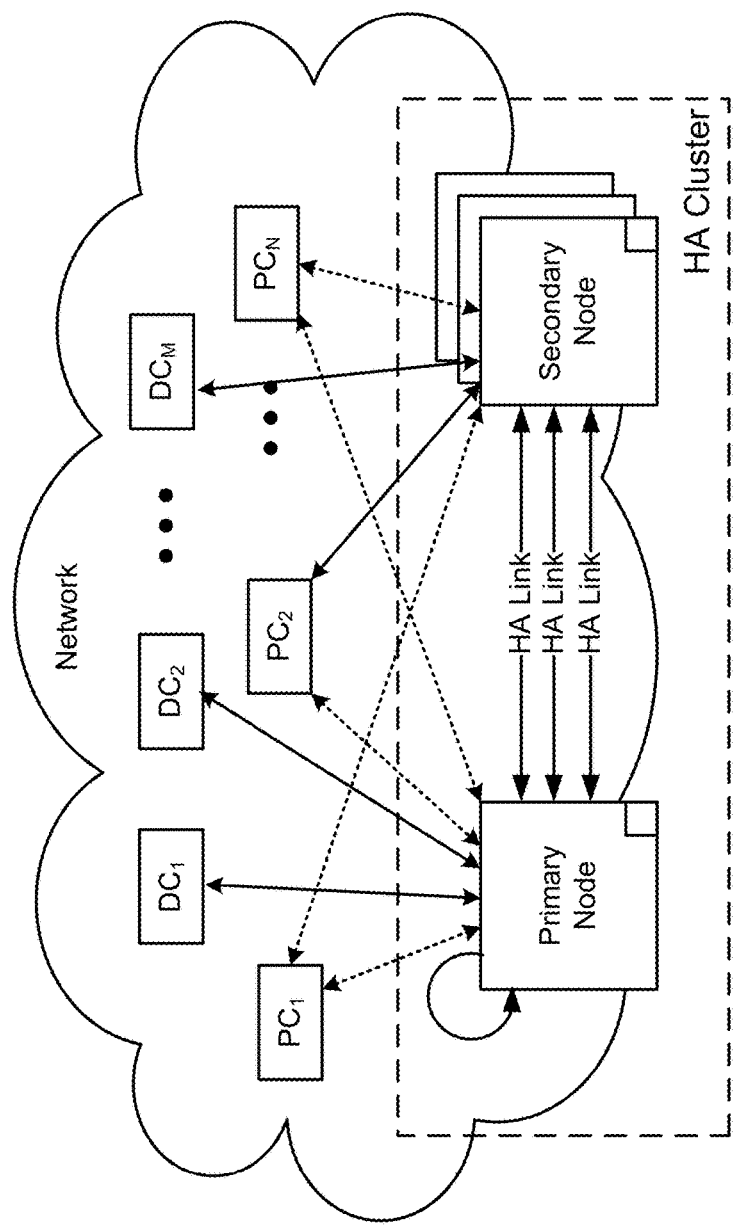
FIGS. 2A and 2B are diagrams of one or more example implementations described herein.
Figure 2B:
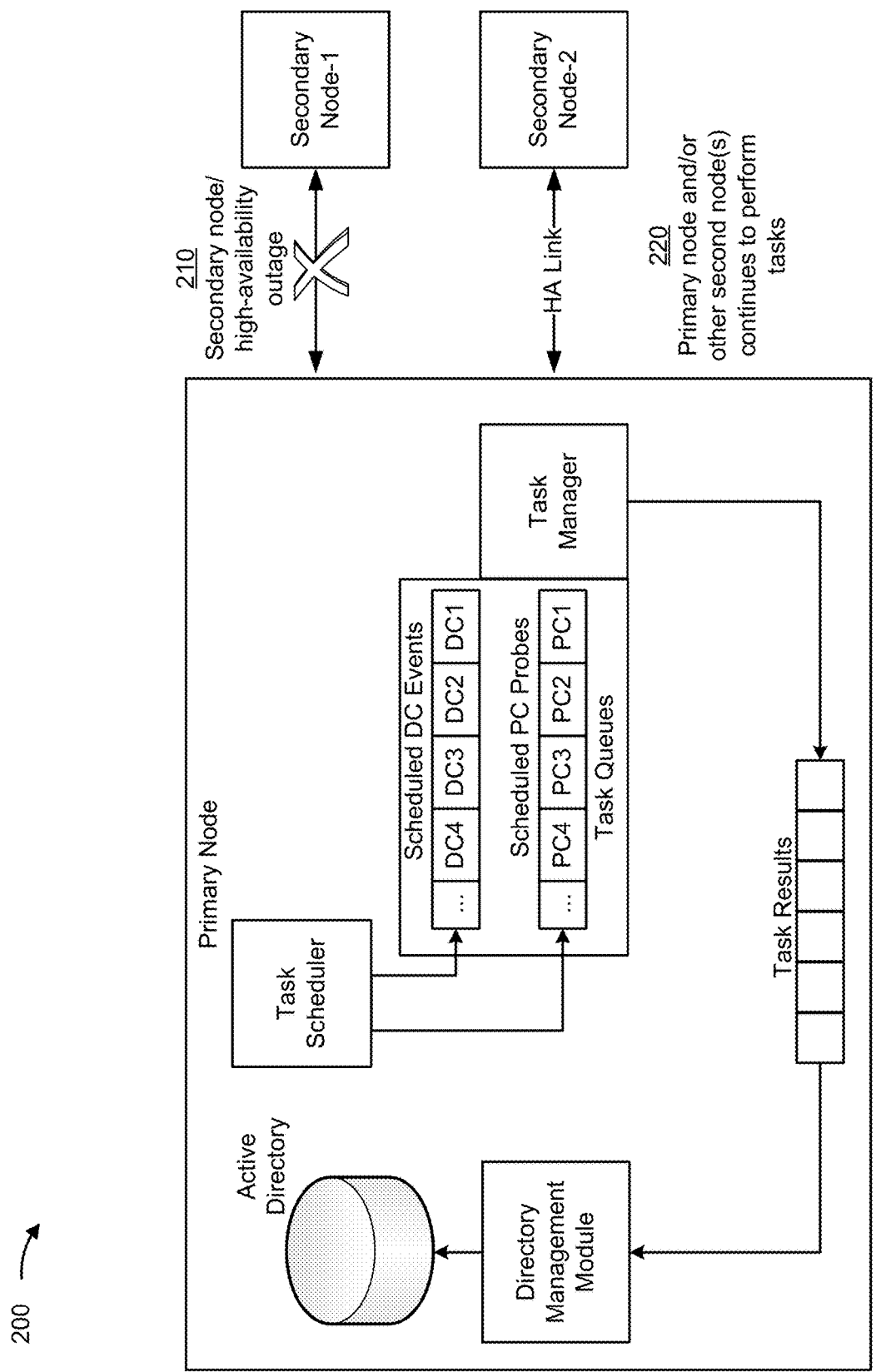

FIGS. 2A and 2B are diagrams of one or more example implementation(s) 200 described herein. As shown in FIGS. 2A-2B, example implementation 100 includes a primary node and one or more secondary nodes in a high-availability cluster, one or more domain controllers (e.g., $DC_1$-$DC_M$, where M indicates a quantity of domain controllers in a network), and one or more user devices (e.g., $PC_1$-$PC_N$, where N indicates a quantity of user devices in the network). The primary node and/or the secondary node may be a network device. The primary node and/or the secondary node may include a router, a switch, or a gateway, among other examples. In some aspects, example implementation(s) 100 may include a greater quantity of nodes, a different quantity of domain controllers, a different quantity of user devices, and/or a greater quantity of high-availability clusters. In some implementations, the high-availability cluster and/or the network may be the same (or similar to) the high-availability cluster and network described above with respect to FIGS. 1A-1C.

As shown in FIG. 2A, the high-availability cluster may be configured to load balance a set of tasks associated with the network between the primary node and the one or more secondary nodes. The primary node and the one or more secondary nodes may communicate via one or more high-availability links. For example, the primary node may be designated to maintain a task queue identifying the set of tasks. The one or more secondary nodes may be designated to access the task queue. The primary node may be configured to perform tasks in the task queue based on a state of a controller of the primary node. The secondary node may be configured to perform tasks in the task queue based on a state of a controller of the secondary node. The primary node and/or the one or more secondary nodes may be configured to communicate with one or more (or all) of the domain controllers and user devices of the network. In some implementations, the one or more secondary nodes may be configured to communicate with a subset of the domain controllers and/or a subset of the user devices of the network (e.g., based on a network topology of the network).

The primary node and the one or more secondary nodes may all be in an active state (e.g., performing tasks and/or other network functions) at the same time. For example, a secondary node of the one or more secondary nodes may select and remove a first task from a task queue of the primary node. The secondary node may perform the task. At the same time that the secondary node is performing the first task, the primary node may select and remove a second task from the task queue of the primary node and perform the second task. The primary node may receive result information associated with the first task from the secondary node. The primary node may update an active directory of the primary node based on the result information associated with first task. The primary node may update the active directory of the primary node based on result information associated with the second task (e.g., performed by the primary node). The primary node may synchronize with one or more (or all) of the secondary nodes such that all nodes in the high-availability cluster have the same information included in the active directories of each node (e.g., an active directory of the secondary node will include information based on a task performed by the primary node).

A primary node and a secondary node may perform tasks associated with the same user device and/or the same domain controller. For example, the primary node may perform a first probe task associated with user device $PC_1$. A secondary node of the one or more secondary nodes may perform a second probe task associated with the user device $PC_1$.

In this way, the primary node may conserve processing resources, memory resources, power resources, and/or the like based on the load balancing between the primary node and the one or more secondary nodes of the high-availability cluster. Additionally, tasks associated with the network may be performed more efficiently as a node of the high-availability cluster performs a task based on an operating state of the node (e.g., one or more nodes may not stay in an idle state if there are available tasks to be performed). As a result, network resources may be conserved that would have otherwise been used waiting for the primary node to perform each task of the network. Additionally, the primary node and/or the secondary node(s) may conserve computing resources and/or network resources that would have otherwise been associated with a reduced performance capability of the primary node (e.g., based on being overloaded due to the load associated with the set of tasks), an unavailability of the primary node (e.g., based on performing and/or assigning the set of tasks), and/or the like.

In some implementations, as shown in FIG. 2B, and by reference number 210, a first secondary node may experience a failure, such as a high-availability outage, a power failure, a hardware failure, and/or the like. As a result, the first secondary node may be unable to perform tasks identified in the task queue of the primary node.

As shown by reference number 220, the primary node and/or other secondary node(s) may continue to perform tasks while the first secondary node is experiencing the failure and is unable to perform tasks. As a result, a task manager of the primary node may continue to perform tasks and/or receive result information from the other secondary node(s). As a result, performance of the high-availability cluster is not impacted based on a failure of one or more secondary nodes. Moreover, if the primary node fails or is overloaded, the secondary node(s) may continue to perform tasks. As a result, the high-availability cluster configured for load sharing between the primary node and one or more secondary nodes may maintain high levels of availability and reliability.

As indicated above, FIGS. 2A and 2B are provided as an example. Other examples may differ from what is described with regard to FIGS. 2A and 2B. The number and arrangement of devices shown in FIGS. 2A and 2B are provided as an example. In practice, there may be additional devices, fewer devices, different devices, or differently arranged than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) shown in FIGS. 2A and 2B may perform one or more functions described as being performed by another set of devices shown in FIGS. 2A and 2B.

Figure 3:
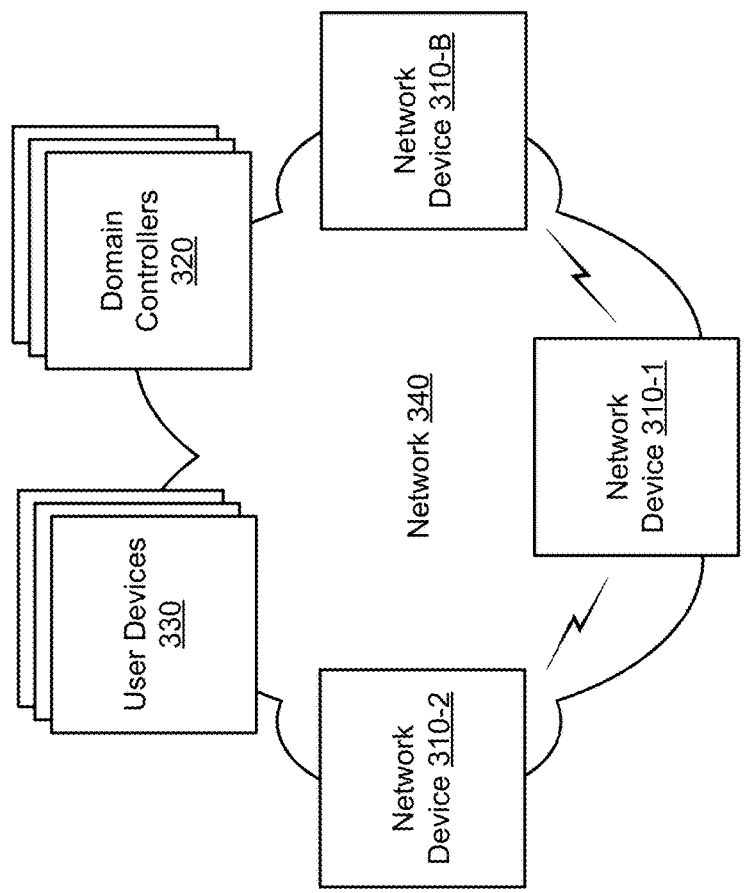
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more network devices 310-1 through 310-B (B≥1) (referred to herein individually as network device 310 or collectively as network devices 310), one or more domain controllers 320 (referred to herein individually as domain controller 320 or collectively as domain controllers 320), one or more user devices 330 (referred to herein individually as user device 330 or collectively as user devices 330), and a network 340. Devices of environment 300 may interconnect via wired connections, wireless connections, or a combination of wired and wireless connections.

Network devices 310 include one or more devices (e.g., one or more traffic transfer devices) capable of processing and/or transferring traffic between endpoint devices (e.g., user devices 330 and/or the like). For example, a network device 310 may include a firewall, a router, a gateway, a switch, a hub, a bridge, a reverse proxy, a server (e.g., a proxy server), a security device, an intrusion detection device, a load balancer, or a similar device. In some implementations, network device 310 may be a physical device implemented within a housing, such as a chassis. In some implementations, network device 310 may be a virtual device implemented by one or more computer devices of a cloud computing environment or a data center. Network devices may correspond to the primary nodes and/or secondary nodes described in connection with example implementation(s) 100 and 200. For example, network device 310-1 may correspond to the primary node and the remaining network devices (e.g., network devices 310-2 through 310-B) may correspond to one or more secondary nodes.

Domain controllers 320 include one or more devices (e.g., one or more traffic transfer devices) capable of processing and/or transferring traffic between endpoint devices (e.g., user devices 330 and/or the like). For example, a domain controller 320 may include a firewall, a router, a gateway, a switch, a hub, a bridge, a reverse proxy, a server (e.g., a proxy server), a security device, an intrusion detection device, a load balancer, or a similar device. In some implementations, domain controller 320 may be a physical device implemented within a housing, such as a chassis. In some implementations, domain controller 320 may be a virtual device implemented by one or more computer devices of a cloud computing environment or a data center.

User devices 330 include one or more devices capable of receiving, generating, storing, processing, and/or providing network traffic associated with an application and/or a session, as described herein. For example, user devices 330 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, user devices 330 may include a cloud-based platform of a cloud computing environment, a web-based platform, an online platform, and/or the like.

Network 340 includes one or more wired and/or wireless networks. For example, network 340 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices)

of environment 300 may perform one or more functions described as being performed by another set of devices of environment 300.

Figure 4A:
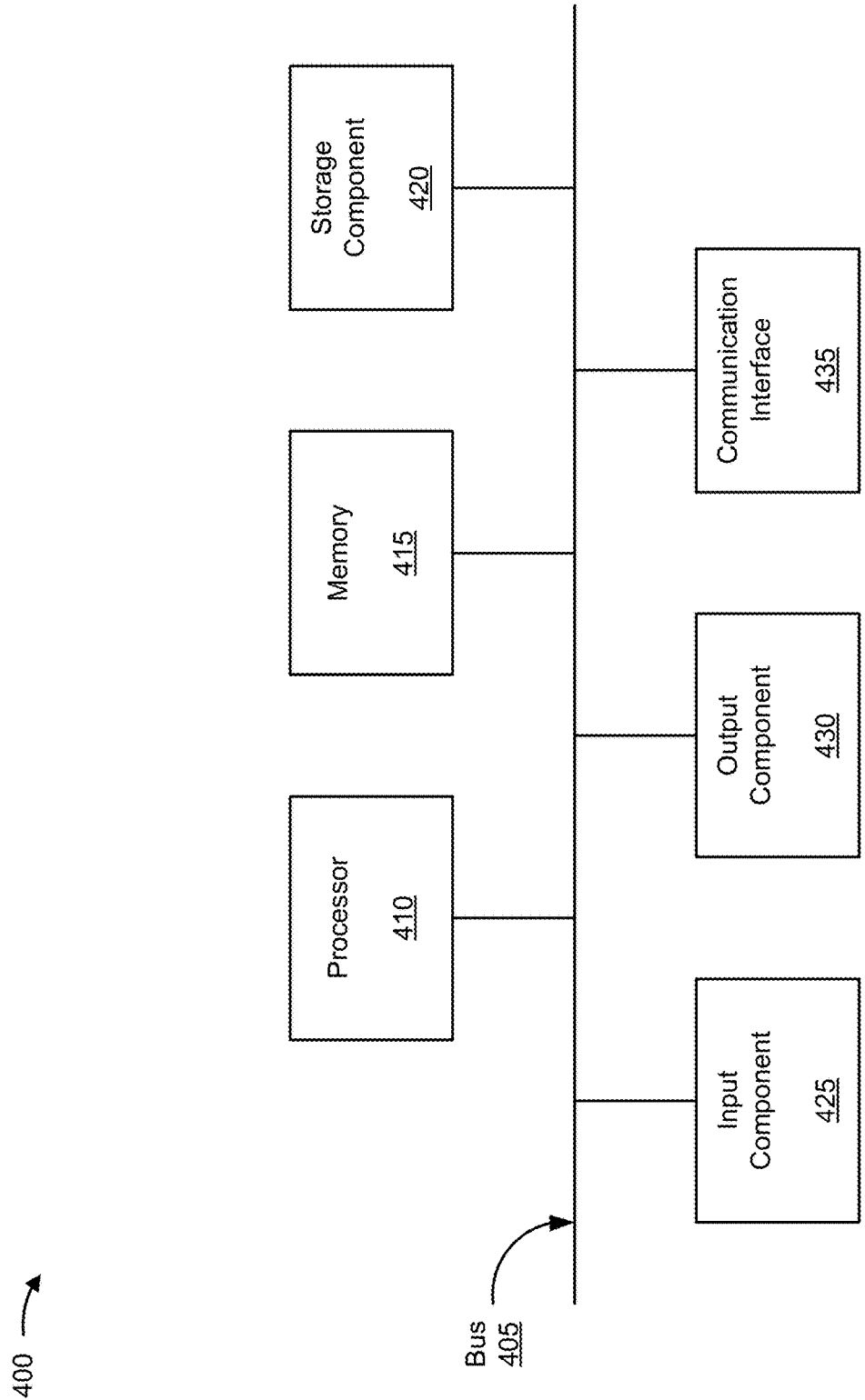
FIGS. 4A and 4B are diagrams of example components of one or more devices of FIG. 3.
Figure 4B:
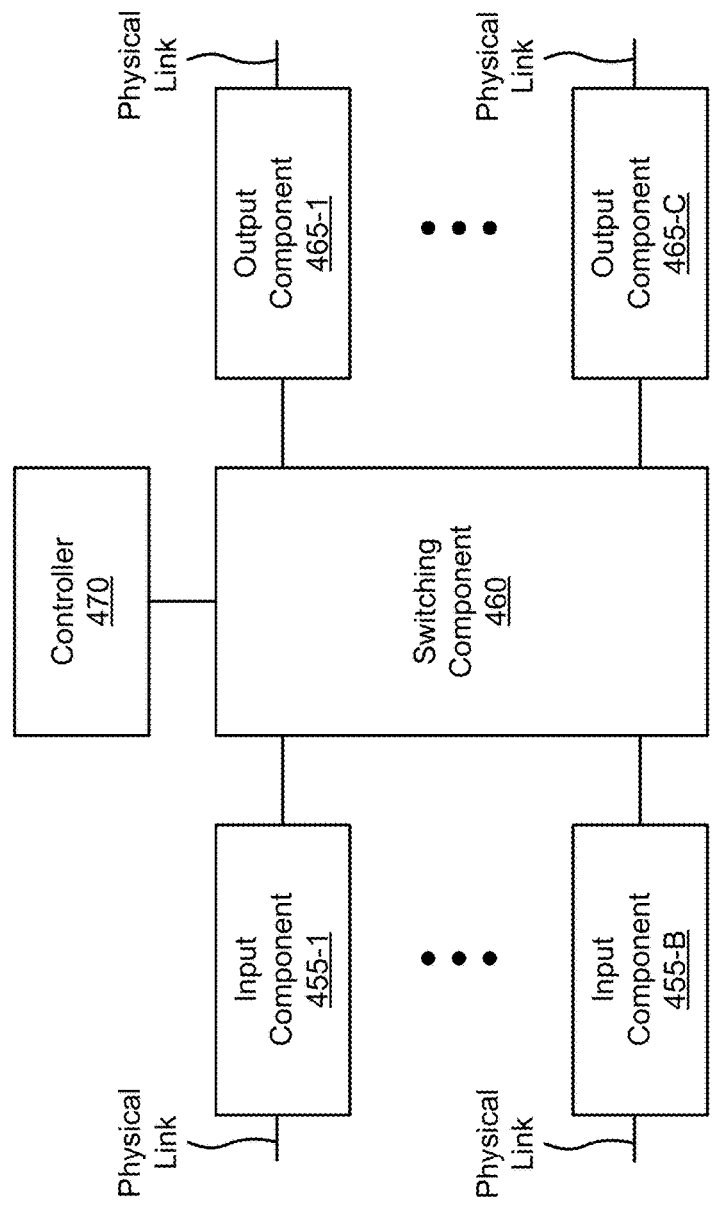

FIGS. 4A and 4B are diagrams of example components of one or more devices of FIG. 2. FIG. 4A is a diagram of example components of a device 400. Device 400 may correspond to one or more network devices 310, one or more domain controllers 320, and/or one or more user devices 330. In some implementations, one or more network devices 310, one or more domain controllers 320, and/or one or more user devices 330 may include one or more devices 400 and/or one or more components of device 400. As shown in FIG. 4A, device 400 may include a bus 405, a processor 410, a memory 415, a storage component 420, an input component 425, an output component 430, and a communication interface 435.

Bus 405 includes a component that permits communication among the components of device 400. Processor 410 is implemented in hardware, firmware, or a combination of hardware and software. Processor 410 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 410 includes one or more processors capable of being programmed to perform a function. Memory 415 includes a random access memory (RAM), a read only memory (ROM), and/or another type of dynamic or static storage device (e.g., a flash memory, a magnetic memory, and/or an optical memory) that stores information and/or instructions for use by processor 410.

Storage component 420 stores information and/or software related to the operation and use of device 400. For example, storage component 420 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 425 includes a component that permits device 400 to receive information, such as via user input (e.g., a touch screen display, a keyboard, a keypad, a mouse, a button, a switch, and/or a microphone). Additionally, or alternatively, input component 425 may include a sensor for sensing information (e.g., a global positioning system (GPS) component, an accelerometer, a gyroscope, and/or an actuator). Output component 430 includes a component that provides output information from device 400 (e.g., a display, a speaker, and/or one or more light-emitting diodes (LEDs)).

Communication interface 435 includes a transceiver-like component (e.g., a transceiver and/or a separate receiver and transmitter) that enables device 400 to communicate with other devices, such as via a wired connection, a wireless connection, or a combination of wired and wireless connections. Communication interface 435 may permit device 400 to receive information from another device and/or provide information to another device. For example, communication interface 435 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 410 executing software instructions stored by a non-transitory computer-readable medium, such as memory 415 and/or storage component 420. A computer-readable medium is defined herein as a non-transitory memory device. A memory device includes memory space within a single physical storage device or memory space spread across multiple physical storage devices.

Software instructions may be read into memory 415 and/or storage component 420 from another computer-readable medium or from another device via communication interface 435. When executed, software instructions stored in memory 415 and/or storage component 420 may cause processor 410 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4A are provided as an example. In practice, device 400 may include additional components, fewer components, different components, or differently arranged components than those shown in FIG. 4A. Additionally, or alternatively, a set of components (e.g., one or more components) of device 400 may perform one or more functions described as being performed by another set of components of device 400.

FIG. 4B is a diagram of example components of a device 450. In some implementations, device 450 may correspond to one or more network devices 310, one or more domain controllers 320, and/or one or more user devices 330. In some implementations, one or more network devices 310, one or more domain controllers 320, and/or one or more user devices 330 may include one or more devices 450 and/or one or more components of device 450. As shown in FIG. 4B, device 450 may include one or more input components 455-1 through 455-B (B≥1) (hereinafter referred to collectively as input components 455, and individually as input component 455), a switching component 460, one or more output components 465-1 through 465-C (C≥1) (hereinafter referred to collectively as output components 465, and individually as output component 465), and a controller 470.

Input components 455 may be points of attachment for physical links and may be points of entry for incoming traffic, such as packets. Input component 455 may process incoming traffic, such as by performing data link layer encapsulation or decapsulation. In some implementations, input component 455 may send and/or receive packets. In some implementations, input component 455 may include an input line card that includes one or more packet processing components (e.g., in the form of integrated circuits), such as one or more interface cards (IFCs), packet forwarding components, line card controller components, input ports, processors, memories, and/or input queues. In some implementations, device 450 may include one or more input components 455.

Switching component 460 may interconnect input components 455 with output components 465. In some implementations, switching component 460 may be implemented via one or more crossbars, via busses, and/or with shared memories. The shared memories may act as temporary buffers to store packets from input components 455 before the packets are eventually scheduled for delivery to output components 465. In some implementations, switching component 460 may enable input components 455, output components 465, and/or controller 470 to communicate.

Output component 465 may store packets and may schedule packets for transmission on output physical links. Output component 465 may support data link layer encapsulation or decapsulation, and/or a variety of higher-level protocols. In some implementations, output component 465 may send packets and/or receive packets. In some implementations, output component 465 may include an output line card that includes one or more packet processing components (e.g., in the form of integrated circuits), such as one or more IFCs, packet forwarding components, line card controller components, output ports, processors, memories, and/or output queues. In some implementations, device 450 may include one or more output components 465. In some implementations, input component 455 and output component 465 may be implemented by the same set of components (e.g., and input/output component may be a combination of input component 455 and output component 465).

Controller 470 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 470 may include one or more processors that can be programmed to perform a function.

In some implementations, controller 470 may include a RAM, a ROM, and/or another type of dynamic or static storage device (e.g., a flash memory, a magnetic memory, an optical memory, etc.) that stores information and/or instructions for use by controller 470.

In some implementations, controller 470 may communicate with other devices, networks, and/or systems connected to device 400 to exchange information regarding network topology. Controller 470 may create routing tables based on the network topology information, create forwarding tables based on the routing tables, and forward the forwarding tables to input components 455 and/or output components 465. Input components 455 and/or output components 465 may use the forwarding tables to perform route lookups for incoming and/or outgoing packets.

Controller 470 may perform one or more processes described herein. Controller 470 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 470 from another computer-readable medium or from another device via a communication interface. When executed, software instructions stored in a memory and/or storage component associated with controller 470 may cause controller 470 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4B are provided as an example. In practice, device 450 may include additional components, fewer components, different components, or differently arranged components than those shown in FIG. 4B. Additionally, or alternatively, a set of components (e.g., one or more components) of device 450 may perform one or more functions described as being performed by another set of components of device 450.

Figure 5:
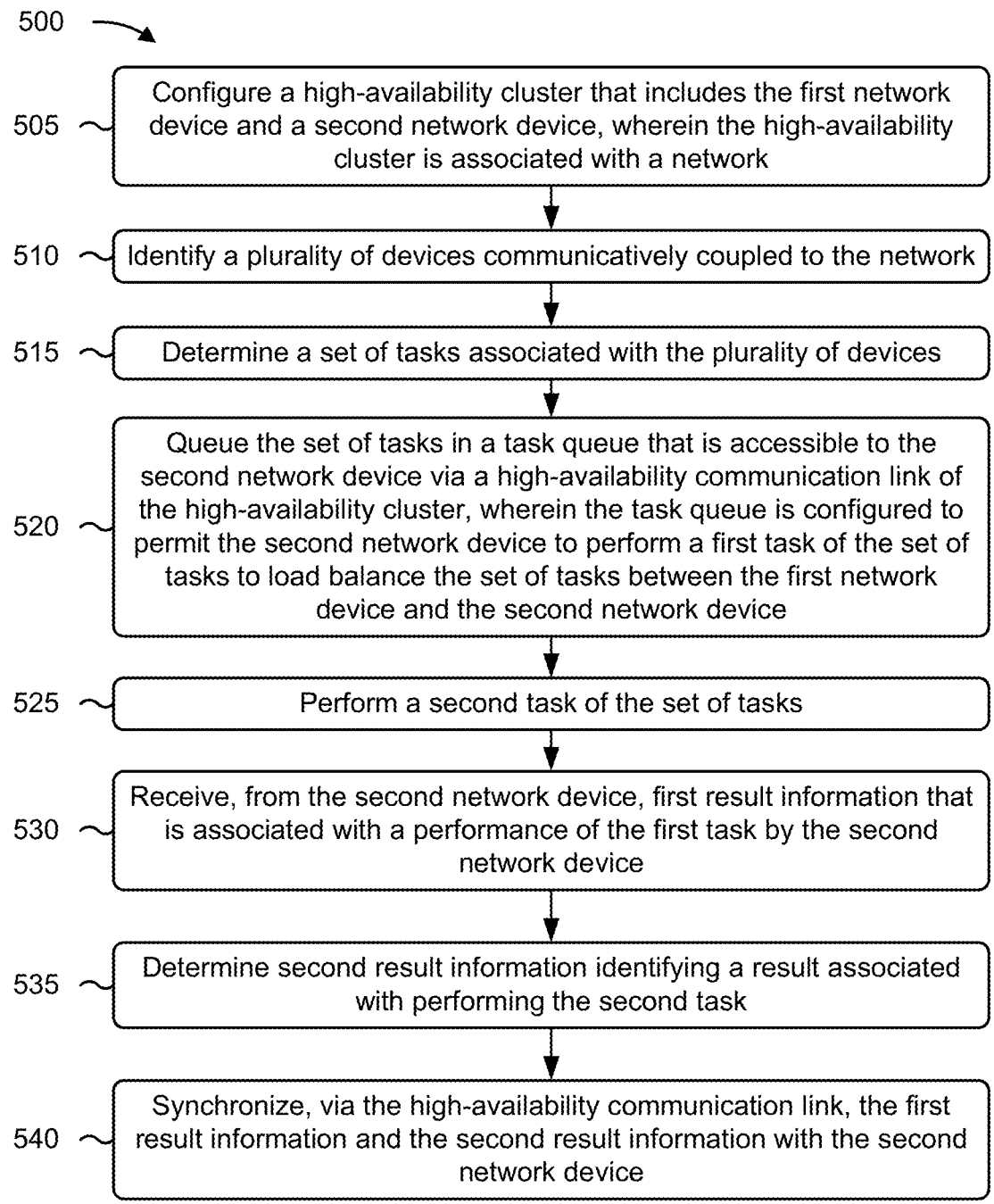
FIGS. 5-7 are flow charts of example processes relating to load balancing in a high-availability cluster.

FIG. 5 is a flow chart of an example process 500 associated with load balancing in a high-availability cluster. In some implementations, one or more process blocks of FIG. 5 may be performed by a first network device (e.g., network device 310-1). In some implementations, one or more process blocks of FIG. 5 may be performed by another device or a group of devices separate from or including the first network device, such as one or more other network devices (e.g., network device 310-2 through 310-B, and/or the like), one or more domain controllers (e.g., domain controllers 320), one or more user devices (e.g., user devices 330), and/or the like.

As shown in FIG. 5, process 500 may include configuring a high-availability cluster that includes the first network device and a second network device, wherein the high-availability cluster is associated with a network (block 505). For example, the first network device (e.g., using processor 410, memory 415, storage component 420, input component 425 and/or input component 455, output component 430 and/or output component 465, communication interface 435, switching component 460, controller 470, and/or the like) may configure a high-availability cluster that includes the first network device and a second network device, as described above. In some implementations, the high-availability cluster is associated with a network.

As further shown in FIG. 5, process 500 may include identifying a plurality of devices communicatively coupled to the network (block 510). For example, the first network device (e.g., using processor 410, memory 415, storage component 420, input component 425 and/or input component 455, output component 430 and/or output component 465, communication interface 435, switching component 460, controller 470, and/or the like) may identify a plurality of devices communicatively coupled to the network, as described above.

As further shown in FIG. 5, process 500 may include determining a set of tasks associated with the plurality of devices (block 515). For example, the first network device (e.g., using processor 410, memory 415, storage component 420, input component 425 and/or input component 455, output component 430 and/or output component 465, communication interface 435, switching component 460, controller 470, and/or the like) may determine a set of tasks associated with the plurality of devices, as described above.

As further shown in FIG. 5, process 500 may include queuing the set of tasks in a task queue that is accessible to the second network device via a high-availability communication link of the high-availability cluster, wherein the task queue is configured to permit the second network device to perform a first task of the set of tasks to load balance the set of tasks between the first network device and the second network device (block 520). For example, the first network device (e.g., using processor 410, memory 415, storage component 420, input component 425 and/or input component 455, output component 430 and/or output component 465, communication interface 435, switching component 460, controller 470, and/or the like) may queue the set of tasks in a task queue that is accessible to the second network device via a high-availability communication link of the high-availability cluster, as described above. In some implementations, the task queue is configured to permit the second network device to perform a first task of the set of tasks to load balance the set of tasks between the first network device and the second network device.

As further shown in FIG. 5, process 500 may include performing a second task of the set of tasks (block 525). For example, the first network device (e.g., using processor 410, memory 415, storage component 420, input component 425 and/or input component 455, output component 430 and/or output component 465, communication interface 435, switching component 460, controller 470, and/or the like) may perform a second task of the set of tasks, as described above.

As further shown in FIG. 5, process 500 may include receiving, from the second network device, first result information that is associated with a performance of the first task by the second network device (block 530). For example, the first network device (e.g., using processor 410, memory 415, storage component 420, input component 425 and/or input component 455, output component 430 and/or output component 465, communication interface 435, switching component 460, controller 470, and/or the like) may receive, from the second network device, first result information that is associated with a performance of the first task by the second network device, as described above.

As further shown in FIG. 5, process 500 may include determining second result information identifying a result associated with performing the second task (block 535). For example, the first network device (e.g., using processor 410, memory 415, storage component 420, input component 425 and/or input component 455, output component 430 and/or output component 465, communication interface 435, switching component 460, controller 470, and/or the like) may determine second result information identifying a result associated with performing the second task, as described above.

As further shown in FIG. 5, process 500 may include synchronizing, via the high-availability communication link, the first result information and the second result information with the second network device (block 540). For example, the first network device (e.g., using processor 410, memory 415, storage component 420, input component 425 and/or input component 455, output component 430 and/or output component 465, communication interface 435, switching component 460, controller 470, and/or the like) may synchronize, via the high-availability communication link, the first result information and the second result information with the second network device, as described above.

Process 500 may include additional implementations, such as any single implementation or any combination of implementations described below and/or in connection with one or more other processes described elsewhere herein.

In a first implementation, the plurality of devices comprise domain controllers, and the first task and the second task are domain controller tasks that are associated with authenticating one or more user devices that are communicatively coupled to the network.

In a second implementation, alone or in combination with the first implementation, the plurality of devices comprise user devices, and the first task and the second task are probe tasks that are associated with monitoring communication links between the user devices and the network.

In a third implementation, alone or in combination with one or more of the first and second implementations, process 500 includes detecting that a controller of the first network device is in an idle state, wherein performing the second task comprises: performing the second task based on detecting that the controller is in the idle state.

In a fourth implementation, alone or in combination with one or more of the first through third implementations, a portion of the second task is performed by the first network device during a same time period that the second network device performs a portion of the first task.

In a fifth implementation, alone or in combination with one or more of the first through fourth implementations, the task queue is maintained within a task data structure of the first network device.

In a sixth implementation, alone or in combination with one or more of the first through fifth implementations, the first network device is a master node of the high-availability cluster and the second network device is a backup node of the high-availability cluster.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
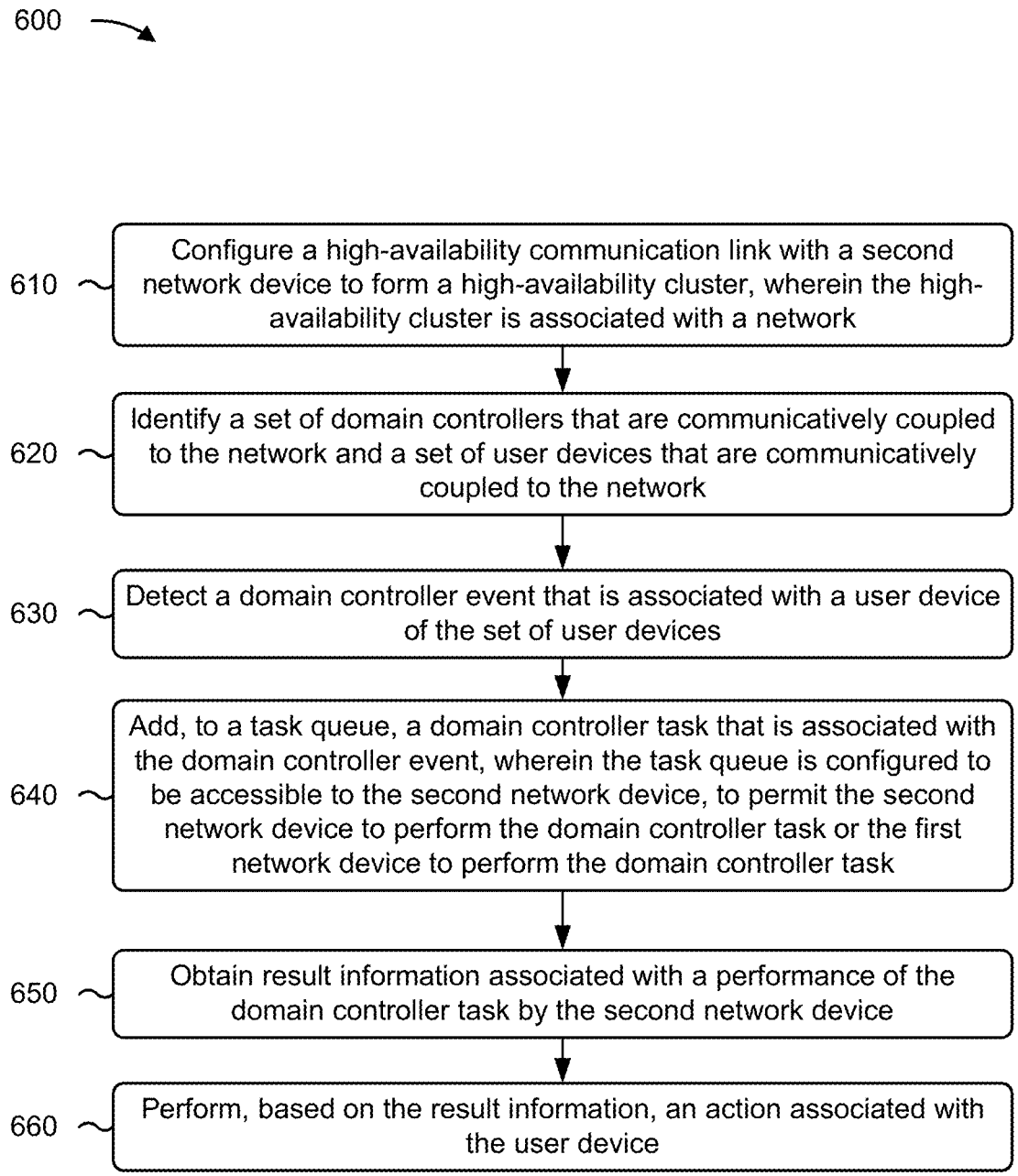

FIG. 6 is a flow chart of an example process 600 associated with load balancing in a high-availability cluster. In some implementations, one or more process blocks of FIG. 6 may be performed by a first network device (e.g., network device 310-1). In some implementations, one or more process blocks of FIG. 6 may be performed by another device or a group of devices separate from or including the first network device, such as one or more other network devices (e.g., network device 310-2 through 310-B, and/or the like), one or more domain controllers (e.g., domain controllers 320), one or more user devices (e.g., user devices 330), and/or the like.

As shown in FIG. 6, process 600 may include configuring a high-availability communication link with a second network device to form a high-availability cluster, wherein the high-availability cluster is associated with a network (block 610). For example, the first network device (e.g., using processor 410, memory 415, storage component 420, input component 425 and/or input component 455, output component 430 and/or output component 465, communication interface 435, switching component 460, controller 470, and/or the like) may configure a high-availability communication link with a second network device to form a high-availability cluster, wherein the high-availability cluster is associated with a network, as described above.

As shown in FIG. 6, process 600 may include identifying a set of domain controllers that are communicatively coupled to the network and a set of user devices that are communicatively coupled to the network (block 620). For example, the first network device (e.g., using processor 410, memory 415, storage component 420, input component 425 and/or input component 455, output component 430 and/or output component 465, communication interface 435, switching component 460, controller 470, and/or the like) may identify a set of domain controllers that are communicatively coupled to the network and a set of user devices that are communicatively coupled to the network, as described above.

As shown in FIG. 6, process 600 may include detecting a domain controller event that is associated with a user device of the set of user devices (block 630). For example, the first network device (e.g., using processor 410, memory 415, storage component 420, input component 425 and/or input component 455, output component 430 and/or output component 465, communication interface 435, switching component 460, controller 470, and/or the like) may detect a domain controller event that is associated with a user device of the set of user devices, as described above.

As shown in FIG. 6, process 600 may include adding, to a task queue, a domain controller task that is associated with the domain controller event, wherein the task queue is configured to be accessible to the second network device, to permit the second network device to perform the domain controller task or the first network device to perform the domain controller task (block 640). For example, the first network device (e.g., using processor 410, memory 415, storage component 420, input component 425 and/or input component 455, output component 430 and/or output component 465, communication interface 435, switching component 460, controller 470, and/or the like) may add, to a task queue, a domain controller task that is associated with the domain controller event, wherein the task queue is configured to be accessible to the second network device, to permit the second network device to perform the domain controller task or the first network device to perform the domain controller task, as described above.

As shown in FIG. 6, process 600 may include obtaining result information associated with a performance of the domain controller task by the second network device (block 650). For example, the first network device (e.g., using processor 410, memory 415, storage component 420, input component 425 and/or input component 455, output component 430 and/or output component 465, communication interface 435, switching component 460, controller 470, and/or the like) may obtain result information associated with a performance of the domain controller task by the second network device, as described above.

As shown in FIG. 6, process 600 may include performing, based on the result information, an action associated with the user device (block 660). For example, the first network device (e.g., using processor 410, memory 415, storage component 420, input component 425 and/or input component 455, output component 430 and/or output component 465, communication interface 435, switching component 460, controller 470, and/or the like) may perform, based on the result information, an action associated with the user device, as described above.

Process 600 may include additional implementations, such as any single implementation or any combination of implementations described below and/or in connection with one or more other processes described elsewhere herein.

In a first implementation, process 600 includes designating the first network device to maintain the task queue; designating the second network device to access the task queue; configuring, based on a state of a controller of the first network device, the first network device to perform tasks in the task queue, and configuring, based on a state of a controller of the second network device, the second network device to perform the tasks in the task queue.

In a second implementation, alone or in combination with the first implementation, the task queue is a first task queue, the result information indicates that the user device is an authorized user device of the network, and performing the action includes scheduling a probe task associated with the user device in a second task queue, wherein the second task queue is accessible to the second network device to permit the second network device to perform the probe task or the first network device to perform the probe task.

In a third implementation, alone or in combination with one or more of the first and second implementations, the first network device is a master node of the high-availability cluster and the second network device is a backup node of the high-availability cluster.

In a fourth implementation, alone or in combination with one or more of the first through third implementations, the user device is a first user device, the domain controller event is a first domain controller event, the domain controller task is a first domain controller task, and process 600 includes: detecting a second domain controller event that is associated with a second user device of the set of user devices; adding, to the task queue, a second domain controller task that is associated with the second domain controller event; performing, based on the processor being idle, the second domain controller task to determine a result of the second domain controller task, and performing an action associated with the result.

In a fifth implementation, alone or in combination with one or more of the first through fourth implementations, the second user device and the first user device are the same device.

In a sixth implementation, alone or in combination with one or more of the first through fifth implementations, performing the action includes updating a directory data structure of the first network device to include the result information, wherein user data of the directory data structure is configured to be synchronized with the second network device via the high-availability communication link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
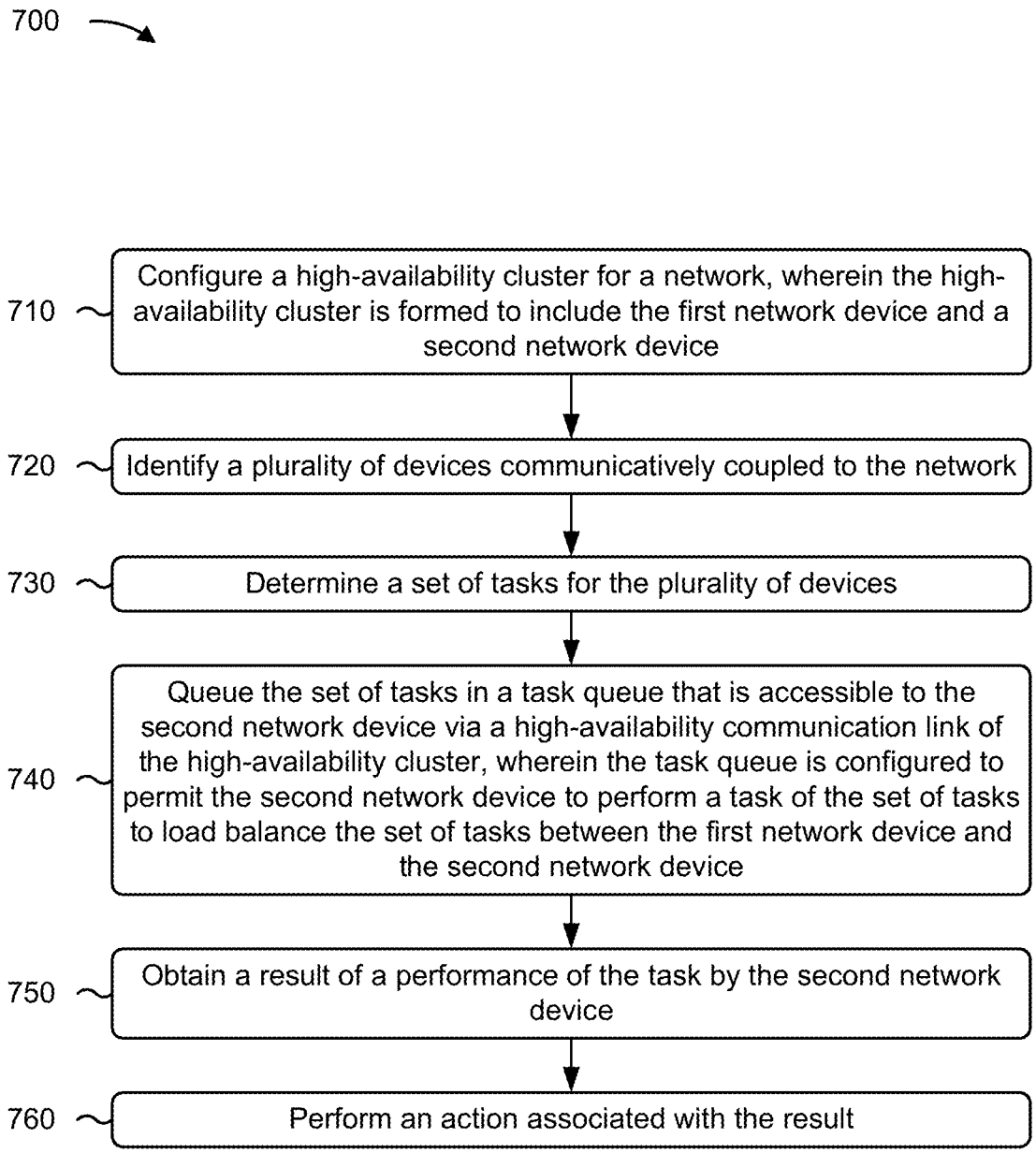

FIG. 7 is a flow chart of an example process 700 associated with to load balancing in a high-availability cluster. In some implementations, one or more process blocks of FIG. 7 may be performed by a first network device (e.g., network device 310-1). In some implementations, one or more process blocks of FIG. 7 may be performed by another device or a group of devices separate from or including the first network device, such as one or more other network devices (e.g., network device 310-2 through 310-B, and/or the like), one or more domain controllers (e.g., domain controllers 320), one or more user devices (e.g., user devices 330), and/or the like.

As shown in FIG. 7, process 700 may include configuring a high-availability cluster for a network, wherein the high-availability cluster is formed to include the first network device and a second network device (block 710). For example, the first network device (e.g., using processor 410, memory 415, storage component 420, input component 425 and/or input component 455, output component 430 and/or output component 465, communication interface 435, switching component 460, controller 470, and/or the like) may configure a high-availability cluster for a network, as described above. In some implementations, the high-availability cluster is formed to include the first network device and a second network device.

As further shown in FIG. 7, process 700 may include identifying a plurality of devices communicatively coupled to the network (block 720). For example, the first network device (e.g., using processor 410, memory 415, storage component 420, input component 425 and/or input component 455, output component 430 and/or output component 465, communication interface 435, switching component 460, controller 470, and/or the like) may identify a plurality of devices communicatively coupled to the network, as described above.

As further shown in FIG. 7, process 700 may include determining a set of tasks for the plurality of devices (block 730). For example, the first network device (e.g., using processor 410, memory 415, storage component 420, input component 425 and/or input component 455, output component 430 and/or output component 465, communication interface 435, switching component 460, controller 470, and/or the like) may determine a set of tasks for the plurality of devices, as described above.

As further shown in FIG. 7, process 700 may include queuing the set of tasks in a task queue that is accessible to the second network device via a high-availability communication link of the high-availability cluster, wherein the task queue is configured to permit the second network device to perform a task of the set of tasks to load balance the set of tasks between the first network device and the second network device (block 740). For example, the first network device (e.g., using processor 410, memory 415, storage component 420, input component 425 and/or input component 455, output component 430 and/or output component 465, communication interface 435, switching component 460, controller 470, and/or the like) may queue the set of tasks in a task queue that is accessible to the second network device via a high-availability communication link of the high-availability cluster, as described above. In some implementations, the task queue is configured to permit the second network device to perform a task of the set of tasks to load balance the set of tasks between the first network device and the second network device.

As further shown in FIG. 7, process 700 may include obtaining a result of a performance of the task by the second network device (block 750). For example, the first network device (e.g., using processor 410, memory 415, storage component 420, input component 425 and/or input component 455, output component 430 and/or output component 465, communication interface 435, switching component 460, controller 470, and/or the like) may obtain a result of a performance of the task by the second network device, as described above.

As further shown in FIG. 7, process 700 may include performing an action associated with the result (block 760). For example, the first network device (e.g., using processor 410, memory 415, storage component 420, input component 425 and/or input component 455, output component 430 and/or output component 465, communication interface 435, switching component 460, controller 470, and/or the like) may perform an action associated with the result, as described above.

Process 700 may include additional implementations, such as any single implementation or any combination of implementations described below and/or in connection with one or more other processes described elsewhere herein.

In a first implementation, process 700 includes establishing the high-availability communication link; designating the first network device to maintain the task queue; designating the second network device to read the task queue; and configuring the first network device and the second network device to perform one or more of the set of tasks.

In a second implementation, alone or in combination with the first implementation, process 700 includes receiving a communication from a user device that is communicatively coupled to the network; determining that the communication is associated with an event of a domain controller; generating a domain controller task to permit the domain controller to authenticate the user device; and adding the domain controller task to the set of tasks.

In a third implementation, alone or in combination with one or more of the first and second implementations, process 700 includes identifying a probe schedule associated with a user device that is communicatively coupled to the network; generating, according to the probe schedule, a probe task to determine a connectivity status of the user device; and adding the probe task to the set of tasks.

In a fourth implementation, alone or in combination with one or more of the first through third implementations, process 700 includes updating a directory data structure to include information that identifies the result; and enabling data of the directory data structure to be synchronized with the second network device.

In a fifth implementation, alone or in combination with one or more of the first through fourth implementations, the task is a first task, and process 700 includes selecting, based on a processing status of the first network device, a second task of the set of tasks; performing an operation associated with the second task; storing a result of the second task in a directory data structure of the first network device, and synchronizing data of the directory data structure with the second network device via the high-availability communication link.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   configuring, by a first network device, a high-availability cluster that includes the first network device and a second network device,
      wherein the high-availability cluster is associated with a network;
   identifying, by the first network device, a plurality of devices communicatively coupled to the network;
   determining, by the first network device, a set of tasks associated with the plurality of devices;
   queuing, by the first network device, the set of tasks in a task queue maintained within the first network device that is accessible to the second network device via a high-availability communication link of the high-availability cluster to select a task of the set of tasks,
      wherein the task queue is configured to permit the second network device to select, based on a capability of the second network device, a first task of the set of tasks to load balance the set of tasks between the first network device and the second network device, and
      wherein the task queue is configured to permit the second network device to remove the task from the task queue;
   performing, by the first network device, a second task of the set of tasks;
   receiving, by the first network device and from the second network device, first result information that is associated with a performance of the first task by the second network device;
   determining, by the first network device, second result information identifying a result associated with performing the second task; and
   synchronizing, by the first network device and via the high-availability communication link, the first result information and the second result information with the second network device.

2. The method of claim 1, wherein the plurality of devices comprise domain controllers, and
   wherein the first task and the second task are domain controller tasks that are associated with authenticating one or more user devices that are communicatively coupled to the network.

3. The method of claim 1, wherein the plurality of devices comprise user devices, and
   wherein the first task and the second task are probe tasks that are associated with monitoring communication links between the user devices and the network.

4. The method of claim 1, further comprising:
   detecting that a controller of the first network device is in an idle state,
      wherein performing the second task comprises:
         performing the second task based on detecting that the controller is in the idle state.

5. The method of claim 1, wherein a portion of the second task is performed by the first network device during a same time period that the second network device performs a portion of the first task.

6. The method of claim 1, wherein the task queue is maintained within a task data structure of the first network device.

7. The method of claim 1, wherein the first network device is a master node of the high-availability cluster and the second network device is a backup node of the high-availability cluster.

8. A first network device, comprising:
   a memory; and
   a processor to:
      configure a high-availability communication link with a second network device to form a high-availability cluster,
         wherein the high-availability cluster is associated with a network;
      identify a set of domain controllers that are communicatively coupled to the network and a set of user devices that are communicatively coupled to the network;
      detect a domain controller event that is associated with a user device of the set of user devices;
      add, to a task queue maintained within the first network device, a domain controller task that is associated with the domain controller event,
         wherein the task queue is configured to be accessible to the second network device, to permit the second network device to select, based on a capability of the second network device, the domain controller task, and
         wherein the task queue is configured to permit the second network device to remove the domain controller task from the task queue;
      obtain result information associated with a performance of the domain controller task by the second network device; and
      perform, based on the result information, an action associated with the user device.

9. The first network device of claim 8, wherein the processor is further to:
   designate the first network device to maintain the task queue;
   designate the second network device to access the task queue;
   configure, based on a state of a controller of the first network device, the first network device to perform tasks in the task queue; and
   configure, based on a state of a controller of the second network device, the second network device to perform the tasks in the task queue.

10. The first network device of claim 8, wherein the task queue is a first task queue, and the result information indicates that the user device is an authorized user device of the network,
   wherein the processor, when performing the action, is to:
      schedule a probe task associated with the user device in a second task queue, wherein the second task queue is accessible to the second network device to permit the second network device to perform the probe task or the first network device to perform the probe task.

11. The first network device of claim 8, wherein the first network device is a master node of the high-availability cluster and the second network device is a backup node of the high-availability cluster.

12. The first network device of claim 8, wherein the user device is a first user device, the domain controller event is a first domain controller event, the domain controller task is a first domain controller task,
wherein the processor is further to:
detect a second domain controller event that is associated with a second user device of the set of user devices;
add, to the task queue, a second domain controller task that is associated with the second domain controller event;
perform, based on the processor being idle, the second domain controller task to determine a result of the second domain controller task; and
perform an action associated with the result.

13. The first network device of claim 8, wherein the processor, when performing the action, is to:
update a directory data structure of the first network device to include the result information,
wherein user data of the directory data structure is configured to be synchronized with the second network device via the high-availability communication link.

14. A non-transitory computer-readable medium storing instructions, the instructions comprising:
one or more instructions that, when executed by one or more processors of a first network device, cause the one or more processors to:
configure a high-availability cluster for a network,
wherein the high-availability cluster is formed to include the first network device and a second network device;
identify a plurality of devices communicatively coupled to the network;
determine a set of tasks for the plurality of devices;
queue the set of tasks in a task queue maintained in the first network device that is accessible to the second network device via a high-availability communication link of the high-availability cluster to select a task of the set of tasks,
wherein the task queue is configured to permit the second network device to select, based on a capability of the second network device, the task to load balance the set of tasks between the first network device and the second network device,
and wherein the task queue is configured to permit the second network device to remove the task from the task queue;
obtain a result of a performance of the task by the second network device; and
perform an action associated with the result.

15. The non-transitory computer-readable medium of claim 14, wherein the one or more instructions, that cause the one or more processors to configure the high-availability cluster, cause the one or more processors to:
establish the high-availability communication link;
designate the first network device to maintain the task queue;
designate the second network device to read the task queue; and
configure the first network device and the second network device to perform one or more of the set of tasks.

16. The non-transitory computer-readable medium of claim 14, wherein the one or more instructions, that cause the one or more processors to determine the set of tasks, cause the one or more processors to:
receive a communication from a user device that is communicatively coupled to the network;
determine that the communication is associated with an event of a domain controller;
generate a domain controller task to permit the domain controller to authenticate the user device; and
add the domain controller task to the set of tasks.

17. The non-transitory computer-readable medium of claim 14, wherein the one or more instructions, that cause the one or more processors to determine the set of tasks, cause the one or more processors to:
identify a probe schedule associated with a user device that is communicatively coupled to the network;
generate, according to the probe schedule, a probe task to determine a connectivity status of the user device; and
add the probe task to the set of tasks.

18. The non-transitory computer-readable medium of claim 14, wherein the one or more instructions, that cause the one or more processors to perform the action, cause the one or more processors to:
update a directory data structure to include information that identifies the result; and
enable data of the directory data structure to be synchronized with the second network device.

19. The non-transitory computer-readable medium of claim 14, wherein the task is a first task, and
wherein the one or more instructions further cause the one or more processors to:
select, based on a processing status of the first network device, a second task of the set of tasks;
perform an operation associated with the second task;
store a result of the second task in a directory data structure of the first network device; and
synchronize data of the directory data structure with the second network device via the high-availability communication link.

20. The first network device of claim 8, wherein the domain controller task is associated with authenticating one or more user devices that are communicatively coupled to the network.

* * * * *